US007022150B2

(12) United States Patent
Borgström et al.

(10) Patent No.: US 7,022,150 B2
(45) Date of Patent: Apr. 4, 2006

(54) CENTRIFUGAL SEPARATOR HAVING A ROTOR AND DRIVING MEANS THEREOF

(75) Inventors: Leonard Borgström, Tyresö (SE); Claes-Göran Carlsson, Tullinge (SE); Peter Franzén, Tullinge (SE); Claes Inge, Saltsjö-Duvnäs (SE); Torgny Lagerstedt, Stockholm (SE); Hans Moberg, Stockholm (SE); Stefan Szepessy, Stockholm (SE)

(73) Assignee: Alfa Laval Corporate AB, Lund (SE)

( * ) Notice: Subject to any disclaimer, the term of this patent is extended or adjusted under 35 U.S.C. 154(b) by 120 days.

(21) Appl. No.: 10/415,357

(22) PCT Filed: Oct. 19, 2001

(86) PCT No.: PCT/SE01/02284

§ 371 (c)(1),
(2), (4) Date: Aug. 13, 2003

(87) PCT Pub. No.: WO02/34408

PCT Pub. Date: May 2, 2002

(65) Prior Publication Data

US 2004/0025482 A1 Feb. 12, 2004

(30) Foreign Application Priority Data

Oct. 27, 2000 (SE) .................................... 0003915

(51) Int. Cl.
*B01D 45/14* (2006.01)

(52) U.S. Cl. ........................................... 55/338; 55/406

(58) Field of Classification Search .................. 55/338, 55/400, 406; 494/79
See application file for complete search history.

(56) References Cited

U.S. PATENT DOCUMENTS

| | | | | |
|---|---|---|---|---|
| 2,321,144 | A * | 6/1943 | Jones | 494/15 |
| 3,234,716 | A * | 2/1966 | Sevin et al. | 210/360.1 |
| 3,997,104 | A * | 12/1976 | Hein | 494/16 |
| 5,779,618 | A | 7/1998 | Onodera et al. | |
| 2004/0040442 | A1 * | 3/2004 | Franzen et al. | 95/270 |

FOREIGN PATENT DOCUMENTS

| | | |
|---|---|---|
| DE | 164133 | 11/1905 |
| DE | 177817 | 11/1906 |
| DE | 929668 | 6/1955 |
| EP | 0 980 714 A2 | 2/2000 |
| WO | WO 99/56883 | 11/1999 |

* cited by examiner

*Primary Examiner*—Robert A. Hopkins

(74) *Attorney, Agent, or Firm*—Michaud-Duffy Group LLP

(57) ABSTRACT

In a centrifugal separator, the rotor of which is adapted to be driven by means of a gaseous driving fluid, the rotor itself supports a ring of turbine blades extending around the rotational axis of the rotor. A stationary nozzle is adapted to direct a flow of the driving fluid towards the ring of turbine members. After the driving fluid has passed between the turbine blades and has influenced them for driving of the centrifugal rotor, it enters a reversing chamber formed by a stationary reversing member. In the reversing chamber the driving fluid is caused to change its direction and is then conducted again towards the ring of turbine members in order to be utilized a second time for driving of the centrifugal rotor.

21 Claims, 2 Drawing Sheets

CENTRIFUGAL SEPARATOR HAVING A ROTOR AND DRIVING MEANS THEREOF

CROSS-REFERENCE TO RELATED APPLICATIONS

This application is a continuation of International Application No. PCT/SE01/02284 filed on Oct. 19, 2001, which designates the United States of America and was published in English as PCT International Publication No. WO 02/34408 A1 on May 2, 2002, and Swedish Patent Application No. 0003915-6 filed on Oct. 27, 2000. The disclosures of these patent applications are incorporated by reference herein in their entireties.

FIELD OF THE INVENTION

The present invention relates to a centrifugal separator having a rotor and a driving means for rotation of the rotor about a rotational axis by means of a gaseous driving fluid.

BACKGROUND OF THE INVENTION

About 100 hundred years ago pressurised steam was sometimes used for driving centrifugal rotors. A steam turbine was coupled to the driving shaft of a centrifugal rotor in one way or another, usually through a gear device. Since then rotors of high speed separators usually have been driven by means of electrical motors.

Lately, driving of a centrifugal rotor by means of a gas turbine has sometimes been suggested. A gas turbine operated centrifugal rotor is suggested for instance in U.S. Pat. No. 5,779,618. However, no efficient and compact arrangement for gas turbine operation of a centrifugal rotor has been seen.

The present invention has for its object to provide an efficient and compact driving means for the rotor of a centrifugal separator by means of a gaseous driving fluid.

SUMMARY OF THE INVENTION

This object can be obtained by means of a driving means including turbine members connected with the rotor and arranged in a ring around and at some distance from said rotational axis, at least one supply member adapted to direct said driving fluid towards the ring of turbine members in a way such that the rotor is brought into rotation about said rotational axis by successive actuation of the turbine members by said driving fluid, and at least one reversing member, which is adapted to receive at least part of said driving fluid having passed through the ring of turbine members and conduct it back towards the ring of turbine members in a way such that the rotor once more is actuated in its rotational direction by such returned driving fluid.

A driving means of this kind can be made efficient, because the energy of the driving fluid can be utilised in an advantageous way, and also be made compact because the driving means can be integrated with the rotor itself.

Even if it is possible to arrange the supply member for the driving fluid so that it directs the driving fluid axially towards the turbine members, it is assumably most advantageous to arrange one of the supply member and the reversing member radially outside the ring of turbine members and the other one of the supply member and the reversing member radially inside the ring of the turbine members. It is assumed that the available space would be utilised most effectively if the supply member is arranged radially outside and the reversing member radially inside said ring of turbine members.

If two or more supply members and reversing members are used, it is suitable that these are distributed evenly around the ring of turbine members, so that a balanced loading of the rotor is obtained from the forces to which this is subjected by the driving fluid. If only two supply members and reversing members, respectively, are used these are, thus, arranged at diametrically opposite sides of the ring of turbine members. This is advantageous for the life time of the bearings, through which the rotor is suspended in a stationary support device, e.g. a housing surrounding the whole rotor.

In order to make possible the most efficient utilisation of the energy of the driving fluid it is suitable that the ring of turbine members is arranged at the radially largest portion of one axial end wall of the rotor. Thus, if the rotor at one axial end has a first portion surrounding the rotational axis and situated at a first radial distance therefrom and a second portion surrounding the rotational axis and situated at a second distance therefrom, said second distance being greater than said first distance, the ring of turbine members should be arranged adjacent to and at the same distance from the rotational axis as said second portion. Preferably, the ring of turbine members is carried directly by said second portion.

The invention may be used in a centrifugal rotor intended for liquid cleaning as well as a centrifugal rotor intended for gas cleaning. When it is used in connection with gas cleaning, the centrifugal rotor is preferably surrounded by a stationary housing having a receiving chamber and an outlet for cleaned gas coming from the centrifugal rotor. If so, the housing is preferably shaped in a way such that gas having been used for driving of the centrifugal rotor is introduced into said receiving chamber and, thus, may leave the centrifugal separator together with the cleaned gas.

BRIEF DESCRIPTION OF THE DRAWINGS

The invention is further described in the following with reference to the accompanying drawing, in which.

DETAILED DESCRIPTION OF THE PREFERRED EMBODIMENTS

Figure 1:
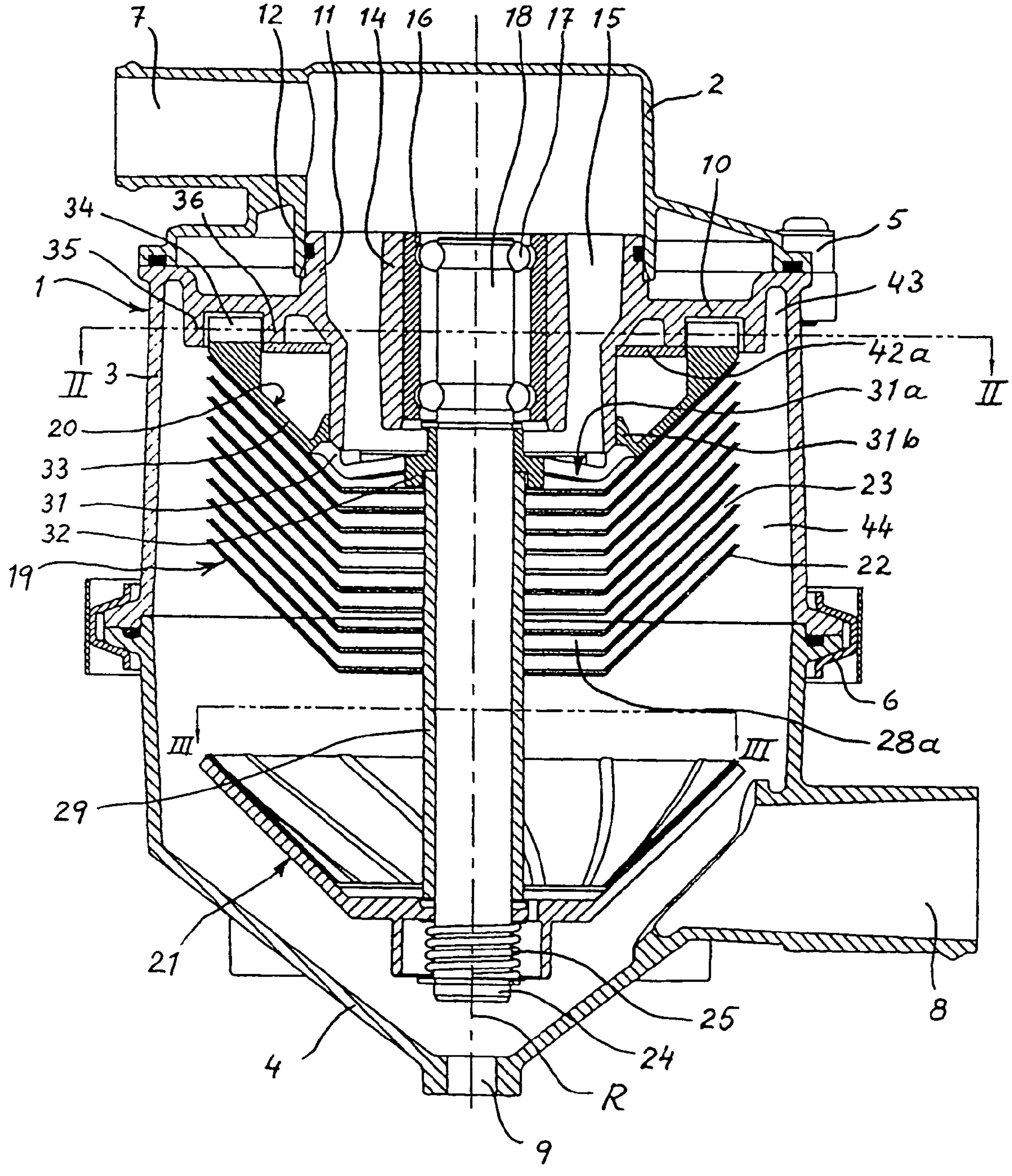
FIG. 1 shows an axial section through a centrifugal separator according to a preferred embodiment of the invention.

The centrifugal separator shown in the drawing includes a stationary housing 1 consisting of an upper part 2, an intermediate part 3 and a lower part 4. The parts are kept together by means of clamping members 5 and 6. The upper housing part 2 forms an inlet 7 for a gas or a gas mixture to be cleaned by means of the centrifugal separator. The lower housing part 4 forms both an outlet 8 for gas having been cleaned and an outlet 9 for material having been separated from the gas.

The intermediate part 3 of the stationary housing forms a surrounding wall, surrounding a space in the housing, and has at its upper end an annular end wall 10 extending a distance inwardly from the surrounding wall. The annular end wall 10 supports within the housing a central sleeve 11, the interior of which communicates with the aforementioned gas inlet 7, that is formed by the upper housing part 2. A gasket 12 is adapted to seal between the upper housing part 2 and the sleeve 11.

The sleeve 11 supports in its said interior, by means of several supporting members 13 (see FIG. 2), a central hub 14. The supporting members 13 are distributed around the periphery of the sleeve and leave between themselves several passages 15 which at their upper ends communicate with the aforementioned gas inlet 7.

On its inside the hub 14 supports a bearing sleeve 16, which in turn supports through bearing balls 17 a vertically extending shaft 18. The shaft 18 extends downwardly into the housing 1 and supports therein a rotor 19. The rotor is rotatable in the housing 1 about a vertical rotational axis R.

Figure 3:
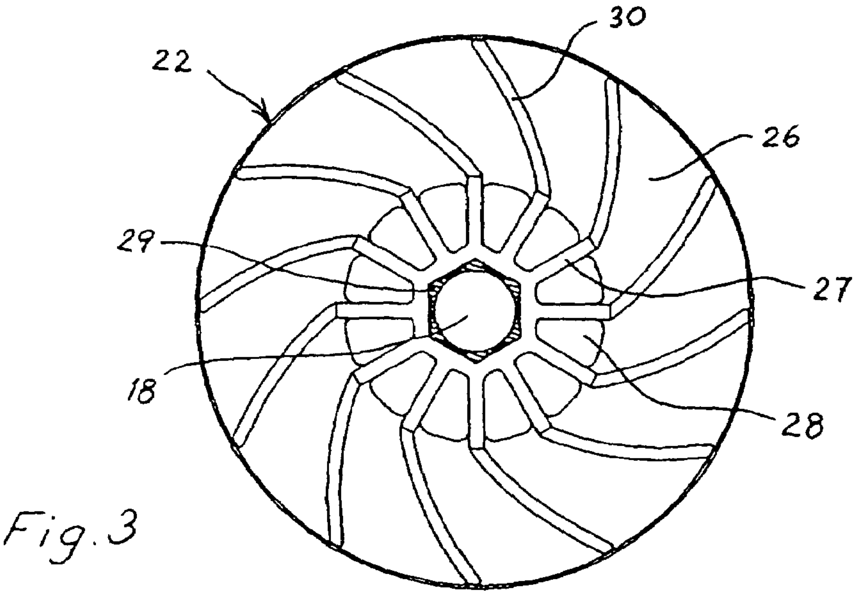

The rotor 19 includes a substantially conical or bowl formed upper end wall 20 and a similarly formed lower end wall 21. Both of the end walls 20 and 21 turn their concave sides upwardly towards the gas inlet 7 of the stationary housing. Between the end walls there is arranged a stack of conical separation discs 22 (only part of the stack is shown in FIG. 1), which between themselves delimit thin interspaces forming through flow passages 23 for gas to be cleaned in the centrifugal separator. The end walls 20 and 21 and the separation discs 22 are kept axially compressed on the shaft 18 by means of a screw 24 and a spring 25. FIG. 3 shows a separation disc 22 seen from above with respect to FIG. 1. The disc has a conical outer portion 26 and a central portion 27 connected therewith. The central portion has a large number of through holes 28 situated at some distance from the centre of the disc and distributed around it. In the assembled rotor 19 (see FIG. 1) these holes 28 form together with the interspaces between the central disc portions 27 a central space 28*a* communicating with the aforementioned through flow passages 23 between the discs 22. Furthermore, the central portion 27 has a central non-round, in this case hexagonal, opening through which the aforementioned shaft 18 is to extend. As can be seen from both FIG. 1 and FIG. 3, the shaft 18 is surrounded by a sleeve 29 extending axially between the rotor end walls 20 and 21. The sleeve 21 has a circular inner cross section but a hexagonal outer cross section, so that the outside of the sleeve may be in rotational engagement with the separation discs 22 as well as the end walls 20 and 21.

On the upper side of each disc 22 there are several rib like protuberances 30 which are evenly distributed around the centre of the disc and which extend across the conical portion 26 of the disc from the central portion 27 to the peripheral edge of the disc. The protuberances 30 serve as spacing members between adjacent separating discs 22 in the rotor and also as flow guiding members during operation of the centrifugal separator, as will be explained later. The rib like protuberances extend on each separating disc in a way such that they form an angle with generatrices of the conical portion 26 of the separation disc.

The upper end wall 20 of the rotor has a radially inner portion 31, that is formed in one piece with a central sleeve 32 surrounding the shaft 18, and a radially outer portion 33. The radially inner portion 31 of the end wall 20 has several through holes 31*a* distributed around the central sleeve 32 and forming a central inlet of the rotor 19 for gas to be cleaned. The holes or inlet 31*a* communicate with the gas inlet 7 in the stationary housing part 2 through the interior of the stationary sleeve 11. The radially inner portion 31 of the end wall 20 further has an annular axial flange 31*b*, which surrounds an end portion of the stationary sleeve 11 in a way such that the smallest possible interspace is formed between the flange 31*b* and the sleeve 11. If desired, a sealing may be arranged in this interspace.

Figure 2:
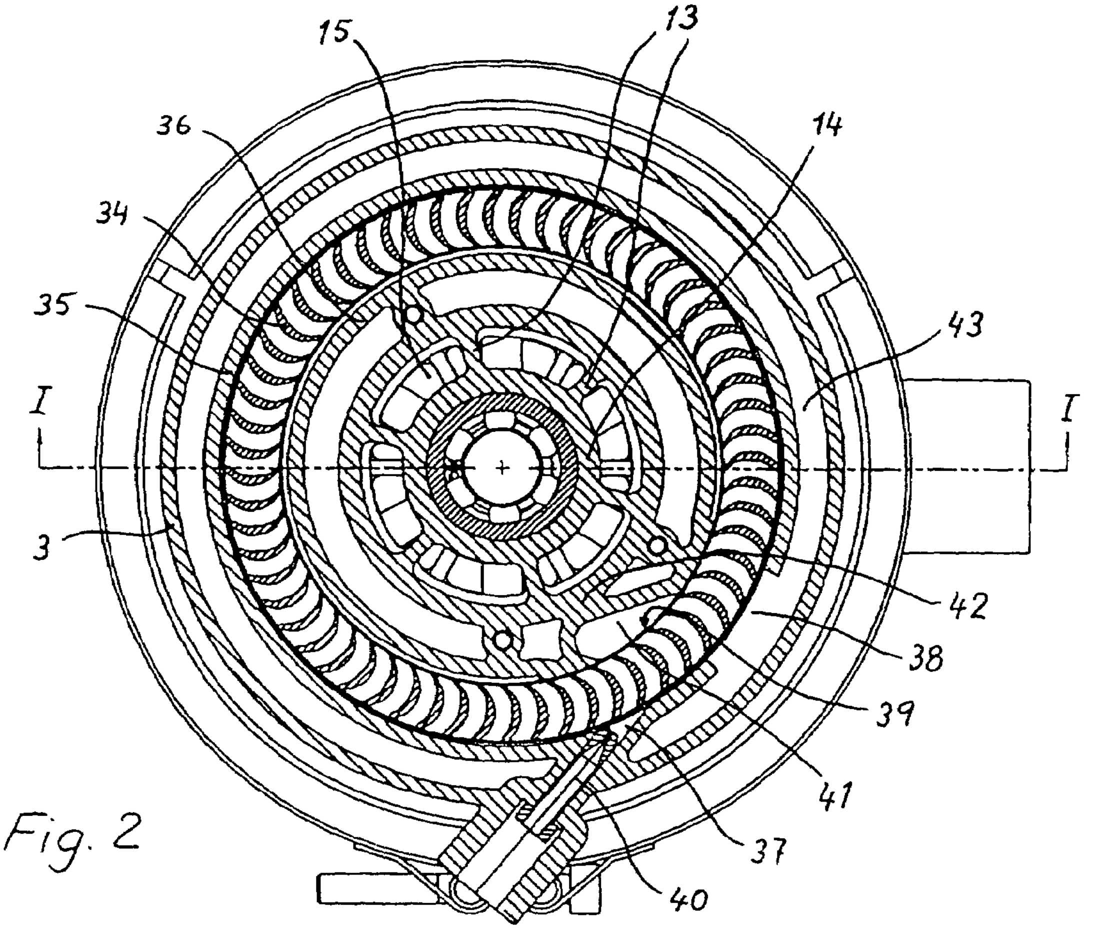
FIGS. 2 and 3 show cross sections along the lines II—II and III—III, respectively, in FIG. 1. The axial section in FIG. 1 is taken along the line I—I in FIG. 2.

The radially outer portion 33 of the end wall 20 supports on its upper side a ring of turbine blades 34, which extends concentrically with the rotational axis R of the rotor (see FIG. 2). The blades 34 are situated in a downwardly facing annular groove on the underside of the end wall 10, formed between two downwardly directed annular, concentric flanges 35 and 36. The ring of turbine blades are, thus, supported on the radially outermost portion of the rotor.

As can be seen from FIG. 2, the two said flanges 35 and 36 do not extend circularly all the way around the rotational axis R. Thus, the outer flange 35 has two interruptions or gaps 37 and 38, whereas the inner flange 36 has one interruption or gap 39. Supported by the intermediate part 3 of the stationary housing a nozzle 40, that extends into the first mentioned interruption or gap 37, is adapted to receive a pressurised gas and to direct a flow of this gas towards the ring of turbine blades 34 from the outside of the ring. The nozzle 40 is directed in a way such that the gas flow causes the blades 34 and, thereby, the whole of the rotor 19 to rotate around the rotational axis R, counter clockwise with respect to FIG. 2.

The blades 34 are somewhat arcuate, as can be seen, which is not really necessary, and conducts the gas stream supplied between adjacent blades to the inside of the ring of blades, where the gas flow enters a small reversing chamber 41. This reversing chamber 41 is delimited between on one side a reversing member 42, that is constituted by part of the stationary end wall 10, and a plate 42*a*, that is fixed to the underside of the end wall 10, and on the other side the ring of turbine blades 34. The reversing chamber is formed in a way such that the gas entering thereinto from the interspaces between the turbine blades 34 is conducted without substantial pressure loss in a curved path a distance forwardly in the rotational direction of the turbine blades to a certain position and after that, again in between the turbine blades 34 situated at this position. The pressurised gas is utilised in this way once more for driving of the ring of turbine blades 34.

When the pressurised gas has again passed through the ring of turbine blades 34, it flows radially outwardly through the interruption or gap 38 in the flange 35 to an annular space 43 in the intermediate part 3 of the stationary housing (see FIG. 1). This space 43 communicates directly with a receiving chamber 44 that surrounds the rotor 19 in the stationary housing 1.

As can be seen from the drawings, the part of the housing 1 surrounding the rotor 19 is substantially rotational symmetric and it has a form substantially adapted to the outer shape of the rotor. The outlet 8 for cleaned gas is situated in a conical portion of the housing part 4 at the same axial height as the lower rotor end wall 21. The outlet 9 for material having been separated from supplied contaminated gas is situated centrally below the rotor 19 aligned with the rotational axis R of the rotor.

As can further be seen from the drawing (see particularly FIG. 2) the reversing member 42 is formed in one piece with and at substantially the same axial level as the sleeve 14, which on its inside supports the bearing 16, 17 for the rotor shaft 18. The reversing member 42 thereby is situated radially seen between the bearing 16, 17 and the turbine blades 34. This gives the centrifugal separator a very compact construction with respect to the arrangement for driving and journalling of the rotor.

The above described centrifugal separator operates in the following manner.

For rotation of the rotor 19 the nozzle 40 is charged with pressurised gas, e.g. compressed air, from a source that is not shown. A flow of gas is directed by the nozzle 40 from a gas supply area, formed by the gap 37 in the flange 35 radially outside the ring of turbine blades 34, towards the outside of this ring, so that the gas flows between the blades and causes these and, thereby, the rotor 19 to rotate counter clockwise with respect to FIG. 2.

Driving gas exiting from the blade interspaces on the inside of the blade ring enters the reversing chamber 41, in which it is deflected forwardly in the rotational direction of the blade ring and, thereafter, again is directed towards the blades 34 for renewed driving thereof. After having been used twice for driving of the turbine blades the gas exits through the gap 38 in the flange 35 into a space 43 (see FIG. 1), from where it flows further on out into the receiving chamber 44 surrounding the rotor 19.

A contaminated gas to be cleaned from solid and/or liquid particles suspended therein is supplied through the gas inlet 7 in the stationary upper housing part 2. The gas flows further through the passages 15 and the rotor inlet 31*a* into the central space 28*a* in the rotor 19. From the central space 28*a* the contaminated gas flows further through the flow passages 23 between the conical portions 26 of the separation discs 22.

Between the separation discs 22 the contaminated gas is brought into rotation by the rotor, particles present in the gas and having a density larger than that of the gas being separated as a consequence of the centrifugal force and being brought into contact with the upper sides of the conical portions 26 of the separation discs. In contact with these portions of the separation discs the particles move as a consequence of the centrifugal force radially along generatrices of the portions 26, the particles or coalesced liquid particles being collected by the inclined ribs 30. The separated particles move by means of the centrifugal force further along the ribs 30 to the peripheral edges of the separation discs, from where they are thrown away from the discs and hit the surrounding wall 3 of the housing.

The gas being gradually freed from particles flows between the adjacent separation discs 22, guided by the ribs 30, towards the peripheral edges of the discs and leaves the rotor at these edges. Via the receiving chamber 44 the cleaned gas flows out of the housing 1 through the outlet 8. This outlet 8, as can be seen, is situated below the level at which particles having been separated from the gas are thrown away from the rotor 19 towards the surrounding wall 3. Even the gas having been used for driving of the rotor 19 leaves the stationary housing through the outlet 8.

As a consequence of the fact that the contaminated gas enters the central space 28*a* in the rotor 19 substantially without rotational movement, whereas the cleaned gas leaves the rotor under rotation at a radius larger than the radius of the central space 28*a*, an underpressure will be formed in the central space 28*a*. Hereby, the contaminated gas need not be supplied to the rotor at an overpressure. Instead, it may be sucked into the rotor from the gas inlet 7 of the stationary housing 1.

The particles separated from the gas, solid and/or liquid, move downwardly along the inside of the surrounding wall 3 and further along the conical lowermost portion of the housing 1 and out through the outlet 9. By the shape of the outlet pipe forming the outlet 8, shown in FIG. 1, i.e. by the fact that this outlet pipe extends a short distance into the interior of the housing 1 and is provided with a flange, it is avoided that separated particles are entrained by cleaned gas out through the outlet 8.

The invention claimed is:

1. A centrifugal separator comprises an inlet for introducing at least one of a gas and gas mixture to be cleaned from particles suspended therein, an outlet for dispensing at least one of a cleaned gas and a cleaned gas mixture, a rotor and a driving means for rotation of the rotor about a rotational axis by means of a gaseous driving fluid, the driving means including turbine members connected with the rotor and arranged in a ring around and at some distance from the rotational axis, at least one supply member for directing said driving fluid towards the ring of turbine members in a way such that the rotor is brought into rotation about said rotational axis by gradual actuation of the turbine members by the driving fluid, and at least one reversing member adapted to receive at least part of said driving fluid having passed through the ring of turbine members and to conduct it back towards the ring of turbine members in a way such that the rotor is once more influenced in its rotational direction by driving fluid thus being reversed.

2. A centrifugal separator according to claim 1, wherein one of the supply member and the reversing member is arranged radially outside the ring of turbine members and the other one of the supply member and the reversing member is arranged radially inside the ring of turbine members.

3. A centrifugal separator according to claim 2, wherein the supply member is arranged radially outside the ring of turbine members and the reversing member is arranged radially inside the ring of turbine members.

4. A centrifugal separator according to claim 1, wherein the rotor at one axial end has a first portion surrounding the rotational axis and situated at a first radial distance therefrom and a second portion surrounding the rotational axis and situated at a second distance therefrom, said second distance being greater than said first distance and the ring of turbine members being arranged adjacent to and at the same distance from the rotational axis as said second portion.

5. A centrifugal separator according to claim 4, wherein the ring of turbine members is carried by said second portion of the rotor.

6. A centrifugal separator according to claim 1, wherein the rotor has a radially outermost portion and the ring of turbine members is situated at substantially the same distance from the rotational axis of the rotor as the radially outermost portion.

7. A centrifugal separator according to claim 1, wherein the rotor at one axial end has a bowl formed end wall having a concave outer side, and the ring of turbine members is supported at a radially outer edge portion of the bowl formed end wall.

8. A centrifugal separator according to claim 1, wherein the rotor includes a stack of conical separation discs, which have apex ends and base ends and which are arranged concentrically with the rotational axis of the rotor, the ring of turbine members being arranged at an axial end of the rotor, towards which the separation discs are facing their base ends.

9. A centrifugal separator according to claim 3, wherein said supply member is adapted to conduct said driving fluid towards the ring of turbine members from a supply area radially outside thereof.

10. A centrifugal separator according to claim 4, wherein the turbine members are adapted to give off driving fluid having been received from the supply member to a receiving area radially inside the ring of turbine members.

11. A centrifugal separator according to claim 1, wherein said reversing member is adapted to reverse at least part of said driving fluid towards the ring of turbine members at a reversing area situated at some distance ahead of the receiving area, seen in the rotational direction of the rotor.

12. A centrifugal separator according to claim 1, wherein the rotor is supported by a shaft, that through a bearing is supported by a stationary carrying member, the turbine members being supported by the rotor and said reversing member being arranged radially between said bearing and the turbine members.

13. A centrifugal separator according to claim 12, in which said stationary carrying member is rigidly connected with the reversing member.

14. A centrifugal separator according to claim 13, wherein the stationary carrying member is formed in one piece with the reversing member.

15. A centrifugal separator according to claim 1, wherein the rotor is adapted to be charged with the at least one gas and gas mixture to be cleaned from particles suspended therein, the rotor is surrounded by a stationary housing, which has the outlet for dispensing the at least one cleaned gas and cleaned gas mixture having been freed from particles in the rotor, the stationary housing delimits a receiving chamber, that is adapted for reception of the at least cleaned gas and cleaned gas mixture from the rotor having been freed from particles, and that communicates with said outlet, and the stationary housing is shaped in a way such that said receiving chamber is adapted for reception of driving fluid leaving the turbine members after having passed the turbine members a second time.

16. A centrifugal separator comprises an inlet for introducing at least one of a gas and gas mixture to be cleaned from particles suspended therein, an outlet for dispensing at least one of a cleaned gas and a cleaned gas mixture, a rotor and a driving means for rotation of the rotor about a rotational axis by means of a gaseous driving fluid, the driving means including:

turbine members connected with the rotor and arranged in a ring around and at some distance from the rotational axis, at least one supply member for directing said driving fluid towards the ring of turbine members in a way such that the rotor is brought into rotation about said rotational axis by gradual actuation of the turbine members by the driving fluid, and at least one reversing member adapted to receive at least part of said driving fluid having passed through the ring of turbine members and to conduct it back towards the ring of turbine members in a way such that the rotor is once more influenced in its rotational direction by driving fluid thus being reversed;

wherein the supply member is arranged radially outside the ring of turbine members and the reversing member is arranged radially inside the ring of turbine members.

17. A centrifugal separator according to claim 16, wherein said supply member is adapted to conduct said driving fluid towards the ring of turbine members from a supply area radially outside thereof.

18. A centrifugal separator comprises an inlet for introducing at least one of a gas and gas mixture to be cleaned from particles suspended therein, an outlet for dispensing at least one of a cleaned gas and a cleaned gas mixture, a rotor and a driving means for rotation of the rotor about a rotational axis by means of a gaseous driving fluid, the driving means including:

turbine members connected with the rotor and arranged in a ring around and at some distance from the rotational axis, at least one supply member for directing said driving fluid towards the ring of turbine members in a way such that the rotor is brought into rotation about said rotational axis by gradual actuation of the turbine members by the driving fluid, and at least one reversing member adapted to receive at least part of said driving fluid having passed through the ring of turbine members and to conduct it back towards the ring of turbine members in a way such that the rotor is once more influenced in its rotational direction by driving fluid thus being reversed; and wherein the rotor at one axial end has a first portion surrounding the rotational axis and situated at a first radial distance therefrom and a second portion surrounding the rotational axis and situated at a second distance therefrom, said second distance being greater than said first distance and the ring of turbine members being arranged adjacent to and at the same distance from the rotational axis as said second portion.

19. A centrifugal separator according to claim 18, wherein the ring of turbine members is carried by said second portion of the rotor.

20. A centrifugal separator according to claim 18, wherein the turbine members are adapted to give off driving fluid having been received from the supply member to a receiving area radially inside the ring of turbine members.

21. A centrifugal separator comprises an inlet for introducing at least one of a gas and gas mixture to be cleaned from particles suspended therein, an outlet for dispensing at least one of a cleaned gas and a cleaned gas mixture, a rotor and a driving means for rotation of the rotor about a rotational axis by means of a gaseous driving fluid, the driving means including:

turbine members connected with the rotor and arranged in a ring around and at some distance from the rotational axis, at least one supply member for directing said driving fluid towards the ring of turbine members in a way such that the rotor is brought into rotation about said rotational axis by gradual actuation of the turbine members by the driving fluid, and at least one reversing member adapted to receive at least part of said driving fluid having passed through the ring of turbine members and to conduct it back towards the ring of turbine members in a way such that the rotor is once more influenced in its rotational direction by driving fluid thus being reversed; and wherein the rotor at one axial end has a bowl formed end wall having a concave outer side, and the ring of turbine members is supported at a radially outer edge portion of the bowl formed end wall.

* * * * *

UNITED STATES PATENT AND TRADEMARK OFFICE

CERTIFICATE OF CORRECTION

PATENT NO. : 7,022,150 B2
DATED : April 4, 2006
INVENTOR(S) : Leonard Borgstrom et al.

It is certified that error appears in the above-identified patent and that said Letters Patent is hereby corrected as shown below:

Column 7,
Line 31, after "the at least" insert -- one --.

Signed and Sealed this

Twenty-third Day of May, 2006

JON W. DUDAS
*Director of the United States Patent and Trademark Office*